Nov. 23, 1926.
D. L. NEWTON
APPARATUS FOR ABSORPTION OF HYDROCARBONS
Filed July 19, 1924  2 Sheets-Sheet 2
1,608,416
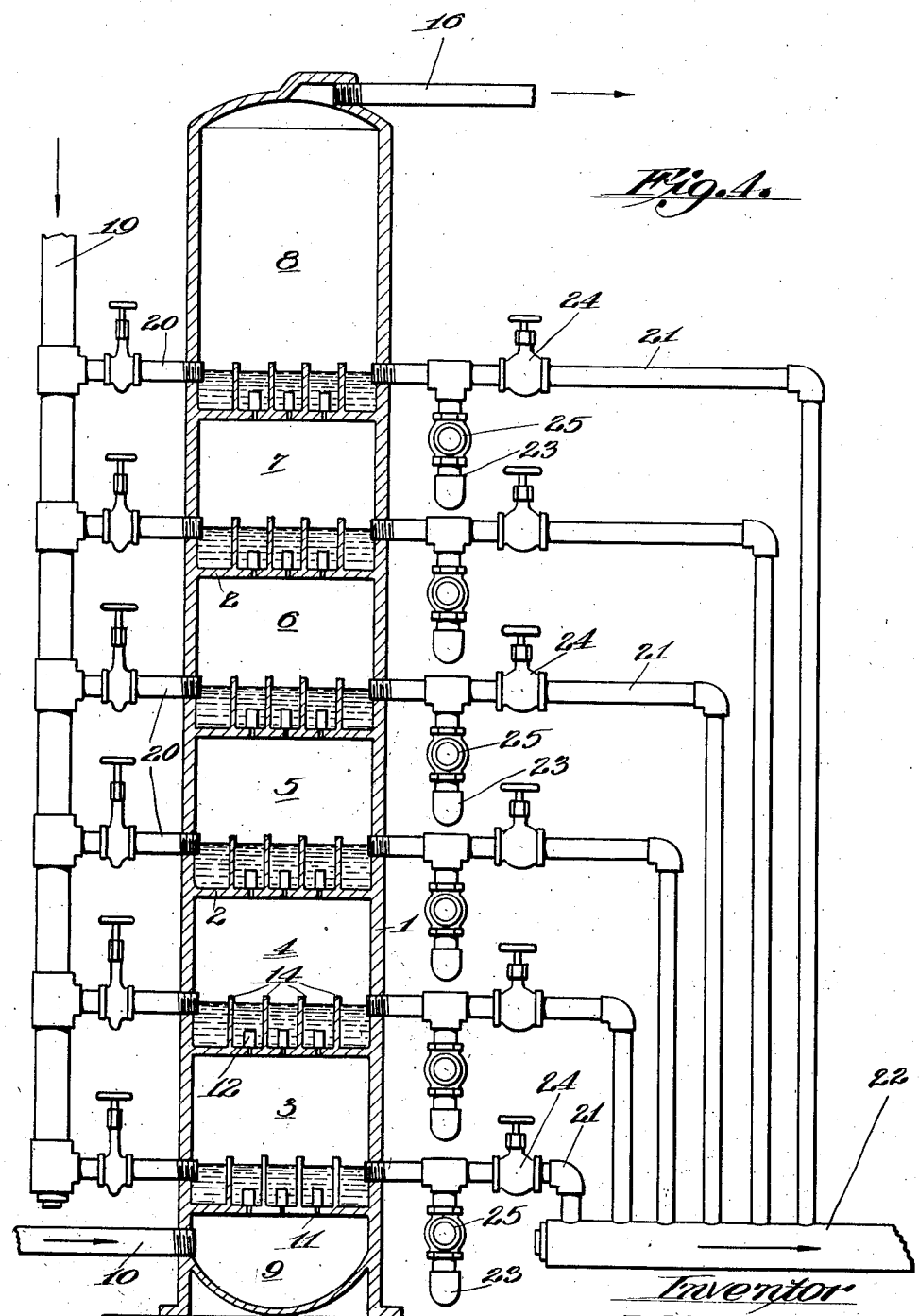

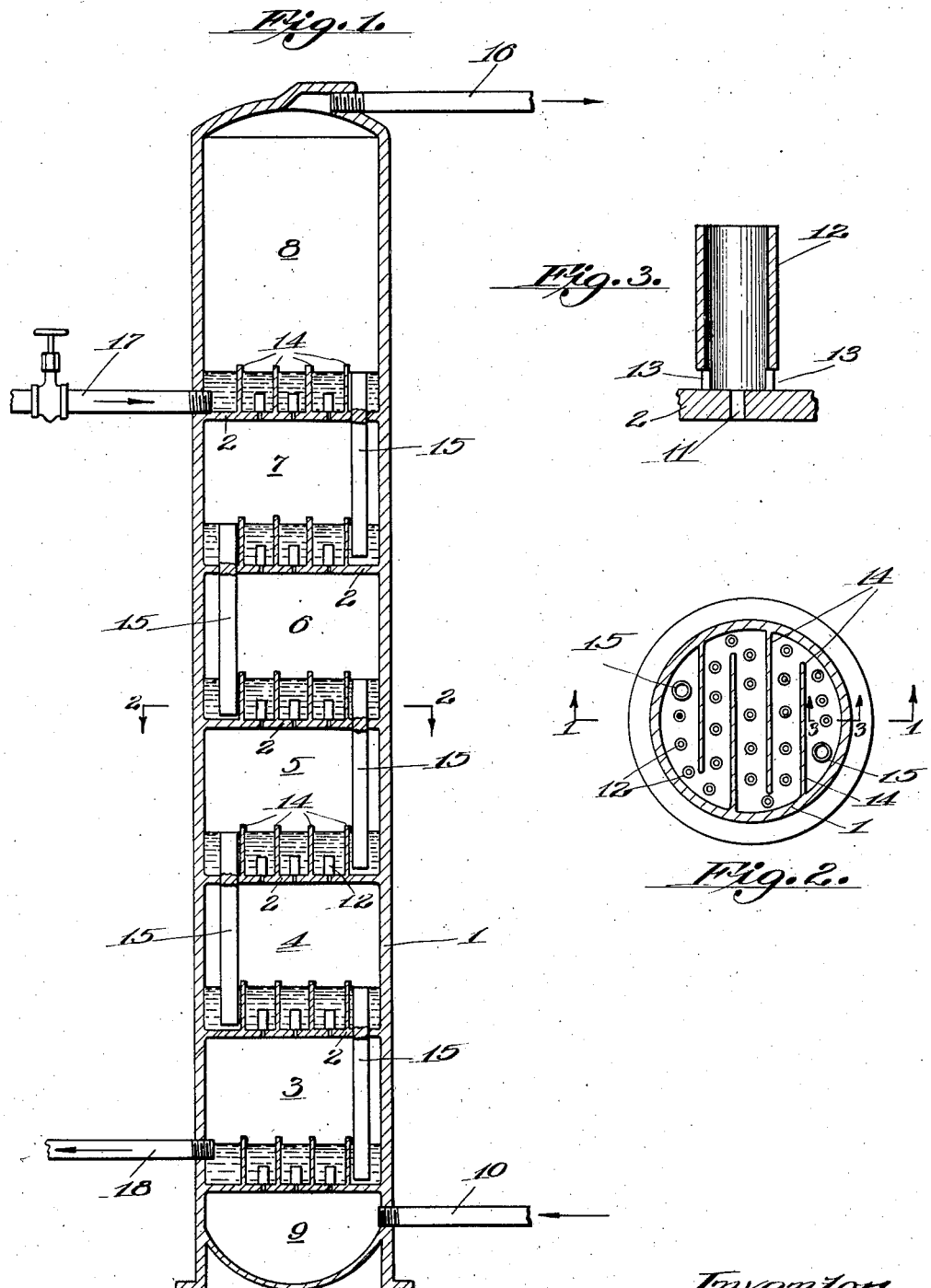

Patented Nov. 23, 1926.

1,608,416

UNITED STATES PATENT OFFICE.

DANIEL L. NEWTON, OF FULLERTON, CALIFORNIA.

APPARATUS FOR ABSORPTION OF HYDROCARBONS.

Application filed July 19, 1924. Serial No. 726,987.

My invention relates to an apparatus for a continuous process for the absorption of hydrocarbons, and more particularly to an apparatus for the absorption of gasoline vapors from natural gas.

It is an object of my invention to provide an apparatus simple in construction and efficient in absorbing a maximum quantity of gasoline from natural gas with a minimum of an absorbing medium, making use of the counter-current system—the gas flowing in one direction and the absorbing medium in the opposite direction, and utilizing the recirculation of the absorbing medium in the absorber itself.

My invention consists in the construction and arrangement of parts hereinafter described and claimed.

Referring to the accompanying drawings which form a part of this specification:

Figure 1 is a vertical cross section of my absorption apparatus.

Fig. 2 is a horizontal cross section taken on the line 2—2 of Fig. 1,

Fig. 3 shows a vertical cross section on an enlarged scale of one of the recirculating jet tubes, and Fig. 4 shows a vertical cross section of a slightly modified form of my absorption apparatus.

Referring to the drawings in which similar reference characters designate similar parts throughout, the numeral 1 indicates a vertical cylindrical shell divided by means of horizontal partitions 2 into a series of mixing compartments, which in the present instance I have shown to be six in number, although the number may be increased or decreased as desired, and which compartments are numbered from the bottom 3, 4, 5, 6, 7 and 8 respectively.

Below the lowest mixing compartment 3 is a gas supply chamber 9, through which the gas enters by means of a pipe 10. The partitions 2 are provided with perforations 11, above each of which there is a recirculating jet tube 12 in the shape of a short horizontal cylinder, open at the top and provided at the bottom with a series of slots or openings 13 adjacent the partitions 2.

Referring to Fig. 2, it is seen that the recirculating jet tubes 12 are preferably arranged in parallel rows, between which are arranged a series of vertical baffle plates 14 in staggered relation. These baffle plates 14 extend a considerable distance above the open ends of the tubes 12.

From each mixing compartment, except the lowest compartment 3, there is a vertical pipe 15 leading to the compartment below. This pipe 15 is open at both ends, the upper end being slightly below the baffle plate 14 and the lower end extending a short distance above the partition 2 in the compartment immediately below. At the top of the cylindrical shell 1 is an outlet pipe 16 for leading the gas, denuded of its gasoline vapors, from the apparatus.

The numeral 17 designates a pipe leading to the compartment 8 just above the partition 2. This pipe 17 serves for the introduction of the absorbing medium which preferably is a mineral oil, such as seal oil, kerosene, stove distillate, and the like, although vegetable oils may also be used.

From the lowest mixing compartment 3, an outlet pipe 18 conducts the absorbing medium charged with the gasoline vapors from the apparatus.

In Fig. 4, I have shown a modified construction of the apparatus in which the vertical pipes 15, leading from one vertical mixing compartment to another, are dispensed with, and the absorbing medium is supplied to each of the mixing compartments 3 to 8 inclusive separately by means of a header pipe 19, from which branch pipes 20 lead to the mixing compartments. Each compartment 3 to 8 inclusive, is provided with an independent outlet pipe 21. The absorbing medium after being charged with the gasoline may be conducted by the outlet pipe 21 to a collecting pipe 22 leading to a still (not shown). In place of having all the outlet pipes 21 communicate with a common header 22, the absorbing medium in each and every compartment 3 to 8 inclusive may be independently conducted to a still (not shown) by means of a branch pipe 23, leading off from pipes 21. Valves 24 and 25 are provided in pipes 21 and 23 respectively to cause the absorbing medium in any particular compartment to be conducted separately to the still for independent treatment. In this manner different grades of gasoline may be produced depending upon the mixing compartment in which the absorbing medium was taken.

In the operation of my apparatus, the casing head gas is supplied in the apparatus through the pipe 10 and may enter the same under a pressure of 1½ to 200 lbs., or even more, although in the normal operation, the pressure is usually from 1½ to 30 lbs. It passes from the supply chamber 9 through the perforations 11 to the first mixing compartment 3 through the recirculating jet tubes 12. As the gas passes upwardly through the tubes 12, it will cause the absorbing medium to be expelled therefrom, and as the latter reenters the tubes 12 through the side openings 13, the gas will cause an intimate mixture of the gas with the absorbing medium. The agitation is so violent that it resembles a boiling process with a great deal of foaming. The baffle plates 14 serve to confine the absorbing medium more or less above each row of the tubes 12. While dimensions may vary greatly, I have found that with the tube 12 3 inches high, a column of liquid 6 inches high and baffle plates 8 inches high, excellent results are obtained. In this manner there is a constant circulation and recirculation of the absorbing medium, which will be thrown upwardly, mixed with the gases passing through the tubes 12, and fall back between the baffle plates and immediately reenter the tubes 12 by the openings 13.

In the lowest mixing compartment 3, a part of the gasoline vapors contained in the gas is condensed and the gas will now pass successively through mixing compartments 4, 5, 6, 7 and 8, in each of which the operation thus described for compartment 3 is repeated and the gasoline is progressively absorbed from the gas so that when the gas reaches the uppermost compartment 8, it is substantially free of any condensible vapors, from which compartment 8 it passes through the outlet pipe 16. Thence the lean gas may be conducted to pipe lines for domestic or other uses.

The absorbing medium enters the apparatus through supply pipe 17, communicating with the topmost compartment 8 and the absorbing medium, successively charged with gasoline, passes from the topmost compartment 8 successively through pipes 15 to the lowest compartment 3, from which the absorbing medium charged with gasoline is taken to a suitable still.

It will be noted that in my apparatus, the absorbing medium entering compartment 8 has the greatest capacity of absorbing gasoline vapors and comes in contact with gas having the smallest percentage of gasoline vapors; while in the lowest mixing compartment 3, the condition is exactly opposite. Gas rich in gasoline vapors comes in contact with the absorbing medium almost completely saturated with gasoline. In this manner a most economical and rapid recovery of the gasoline is effected.

The important feature of this apparatus is the provision of the relatively short recirculating jet tubes 12 in combination with the baffle plates and the maintenance of the proper column of the absorbing medium above the tubes 12 which effects a constant and intimate mixing of the medium and the gas to be treated, as described above.

In Fig. 4, the same process is carried on with the exception that each mixing compartment has an independent supply of fresh absorbing medium, and the medium charged with gasoline may be conducted independently from the absorbing medium of the other compartments to a still and thus different grades of gasoline may be recovered depending upon the compartment from which the absorbing medium was taken.

The modification shown in Fig. 4 is more effective in recovering the gasoline with the lowest amount of absorbing medium. I have recovered gasoline amounting to as much as 28% of the absorbing medium used in the lowest mixing compartment 3 in which the medium comes in contact with the casing head gas from the well; while in the topmost compartment only about 1½% of gasoline calculated on the volume of the absorbing medium used in compartment 3 is recovered.

While I have described the detailed steps of the process and the preferred pressure and temperature conditions, it will be understood by those skilled in the art that these may be varied within wide limits and yield good results without departing from the spirit of my invention as claimed.

I claim:

1. In an apparatus for a continuous process of absorbing condensible hydrocarbon vapors contained in casing head gas by means of a liquid medium and in which said medium is conducted in one direction and the gas in the opposite direction, comprising a plurality of compartments vertically arranged in series, each of said compartments being adapted to contain said liquid medium and having a bottom provided with perforations through which the gas enters, a cylindrical recirculation tube open at the top and provided with side openings near the bottom and vertically disposed over each of said perforations, said tubes being arranged in approximately parallel rows, baffle plates between said rows of tubes extending above the level of the liquid medium, and means for maintaining the level of the absorbing medium at a height substantially twice the height of said tubes.

2. In an apparatus for a continuous process of absorbing condensible hydrocarbon vapors contained in casing head gas by means of a liquid medium and in which said medium is conducted in one direction and the gas in the opposite direction, comprising a vertical cylindrical shell divided into a plurality of compartments vertically arranged in series, each of said compartments being adapted to contain said liquid medium and having a bottom provided with perforations through which the gas enters, a recirculation tube open at the top and disposed over each of said perforations, each tube being provided at its lower end with side openings, means for maintaining the level of the absorbing medium at a substantial height above said tubes, a denuded gas outlet, and a medium outlet.

In testimony whereof I have signed my name to this specification.

D. L. NEWTON.